Feb. 11, 1941.                T. BARISH                 2,230,989
                          BEARING STRUCTURE
                        Filed Sept. 13, 1938

Inventor
Thomas Barish

By Richmond S. Hayes
            Attorney

Patented Feb. 11, 1941

2,230,989

UNITED STATES PATENT OFFICE 2,230,989

BEARING STRUCTURE

Thomas Barish, Jamestown, N. Y., assignor to Marlin-Rockwell Corporation, Jamestown, N. Y., a corporation of New York Application September 13, 1938, Serial No. 229,725

6 Claims. (Cl. 308—189)

The invention relates to an improved bearing structure for use with variable pitch airplane propeller blades.

A propeller of the type to which the present invention is applicable is generally comprised of a hub element to which is fitted two or more blades adapted to rotate with rotation of the hub. Suitable bearings are provided for each blade to facilitate varying the pitch thereof while the propeller is in motion. Propellers of this class are preferably formed from light weight metal, such as an aluminum alloy and, therefore, their manufacture, and the assembly of blades on the hub necessitates a process of fabrication not generally otherwise required. For example, it is impractical to provide threads on the inner or hub end of a blade formed from an aluminum alloy for the purpose of locating a bearing by which the pitch of a blade may be varied with respect to the hub on which it is mounted. It has therefore been necessary to forge the blade to size and shape and, prior to completing the inner or hub-like end thereof, mount one or more elements of the bearing. After the bearing elements have been assembled, the inner end of the blade is upset or flared and provides a circumferential shoulder of large radius for seating the bearing. The blade is then processed, which includes subjecting it to a high temperature for a considerable period of time. The element or elements of the bearing that facilitate varying the blade pitch are subjected to this process and difficulty has been experienced in preventing this treatment from having a detrimental effect thereon.

Through the use of the present invention it is possible to completely fabricate a propeller blade prior to mounting a bearing by which the pitch of the blade is made variable. A bearing adaptable for this purpose may be comprised of an outer ring having an inside diameter substantially that of the outside diameter of the inner or hub end of the blade, so that the ring may be slipped over this portion of the blade subsequent to its fabrication. The bearing also includes an inner ring, that is in two or more parts, having an inner diameter and contour of that of the blade adjacent its inner or hub end. Between the inner and outer rings is located a ball retainer that is also comprised of two or more parts. When the multiple element inner ring and retainer have been assembled on the blade the outer ring is slid into position and encloses these elements, holding them in proper operative position. In some instances, it is expedient to provide a further ring that may be slipped over the inner or hub end of the blade and partially overlie the multiple element inner ring.

The principal object of the invention lies in the provision of a bearing for a variable pitch propeller blade that may be mounted subsequent to complete fabrication of the blade.

Other and further objects and advantages of the invention will be more fully understood from a consideration of the following specification taken in conjunction with the accompanying drawing, and in which.

Figure 2:
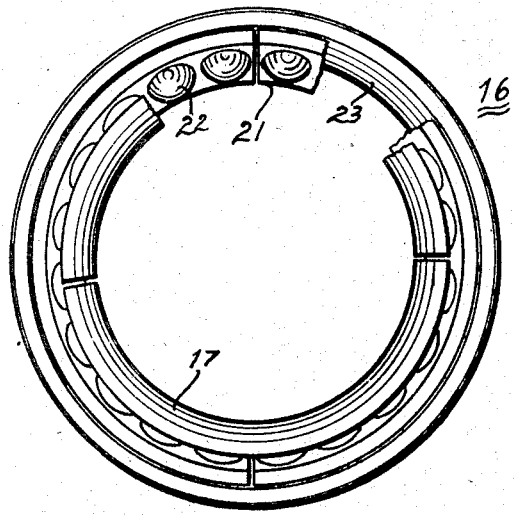
Figure 2 is an elevational view of the bearing shown in Figure 1.

Reference is now had to the drawing wherein the numeral 10 is employed to designate a portion of a variable pitch propeller. The propeller includes a blade 11 which, at the inner end, is formed in a cylindrical hub-like portion 12. A slightly larger diametered shoulder 13 is formed on the end of the portion 12, connection between the portion 12 and shoulder 13 being made through a curved surface 14 of comparatively large radius.

A bearing 16, mounted on the portion 12 of the blade 11, facilitates rotation thereof with respect to the propeller hub when it is desired to vary the blade pitch. This bearing includes an inner ring 17 that, in the present disclosure, is formed from two elements. The inner surface of each of these elements is in engagement with the portion 12, whereas the edges 18 contact one side of the shoulder 13. The inner surface blends with the edges 18 through a curve of the same contour as the surface 14 of the blade 11. The outer surface of the ring 17 is formed with a ball-receiving groove 19. A ball retainer 21 is provided, being formed from two semi-circular elements, and includes suitable openings in which to receive balls 22. The balls project inwardly beyond the limits of the retainer and are adapted to contact the groove 19 of the inner ring 17. A single element outer ring 23 is formed with an inner groove 24 with which the balls 22 contact. The ring 23 is provided with a side flange 26 having an opening 27 therethrough of substantially the same diameter as the diameter of the shoulder 13, for the purpose of permitting mounting the ring on the blade subsequently to fabrication of the portion 12 and shoulder 13.

Figure 1:
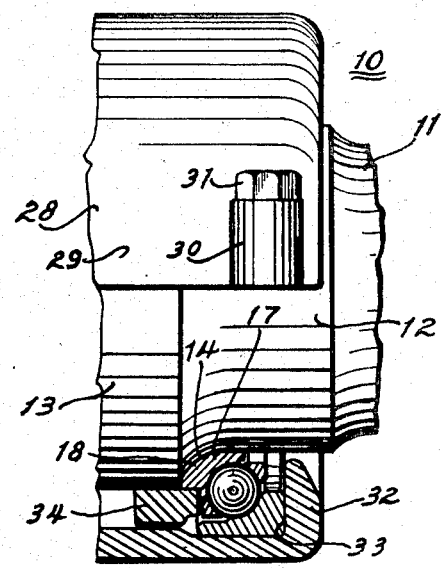
Figure 1 is a fragmentary elevational view, partly in section, of an assembled propeller hub and blade in conjunction with a bearing illustrating one form of the invention.
Figure 3:
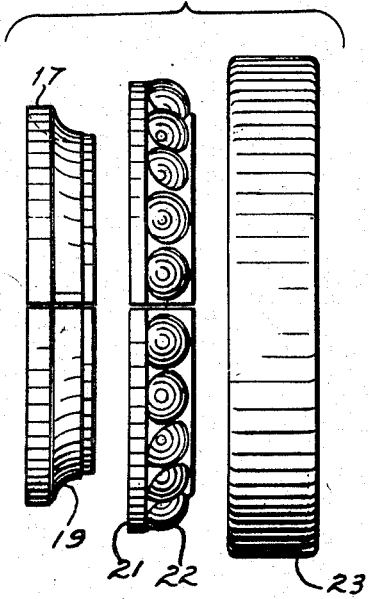
Figure 3 is an elevational view of the bearing elements showing their relative position preparatory to assembly.
Figure 4:
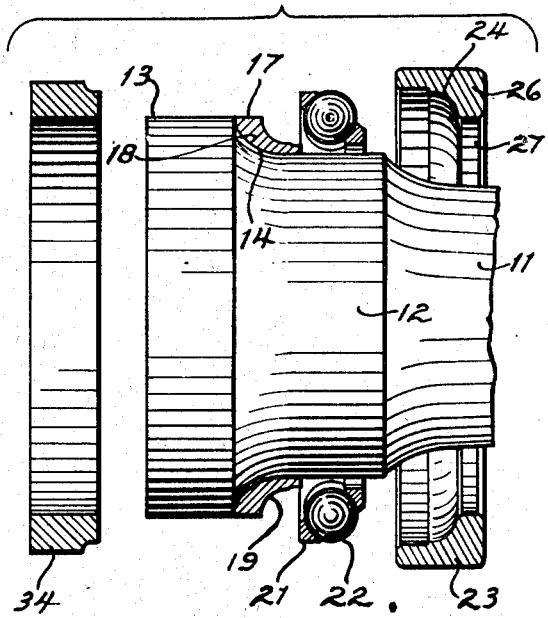
Figure 4 illustrates the method of assembling the bearing on the inner or hub end of a propeller blade.

When the blade 11 has been completely fabricated it may be assembled with one or more similar blades on a hub 28. The outer ring 23 is first slipped over the shoulder 13 and moved to occupy the position indicated in Figure 4 of the drawing. The two-part inner ring 17 is positioned on the cylindrical portion 12. The two-part retainer is then placed so that the balls 22 will contact the groove 19. The outer ring 23 may then be moved to engage the balls 22 and, since this ring is in one piece, the two elements of the inner ring and retainer are held against displacement. That portion of the propeller hub 28 with which the invention is concerned, is formed in two semi-circular parts 29 that are provided with suitable bosses 30 at their meeting edges. Bolts 31 project through the bosses to secure these elements together. Each hub element is formed with a radial end flange 32 that engages the flange 26 of the outer ring 23. An annular depression 33 may be provided adjacent the flange 32 for the purpose of assisting in positioning the ring 23. It will be noted that, when the hub elements have been bolted together, the elements of the bearing 16 are held in operative position substantially as shown in Figure 1 of the drawing.

Due to the fact that the connecting surface 14, between portion 12 and shoulder 13, is of comparatively large radius, there may be a tendency for the inner ring 17 to ride radially upwardly and outwardly. This tendency may be altogether prevented through the provision of a single element ring 34 having an inside diameter substantially that of the shoulder 13 of the blade. When the elements of the bearing have been assembled, the ring 34 is slipped on to the shoulder 13 and moved to partially overlie the inner ring 17 substantially as illustrated in the drawing.

The above described bearing structure is also adaptable for use with a steel propeller blade. Although it is practical to provide a threaded portion at the inner or hub end of a steel blade for the purpose of securing a bearing in place, it has been found, through the use of the present invention, that the threaded portion may be eliminated and thus the blade length and weight may be somewhat lessened.

Although applicant has shown and described only one modification of a bearing applicable to the blade of a variable pitch propeller formed from a metal requiring complete fabrication prior to assembly of the bearing, it will be understood that it is contemplated the structure may be modified or adapted to other uses without departing from the spirit and scope of the invention as defined in the hereunto annexed claims.

Having thus set forth my invention what I claim as new and for which I desire protection by Letters Patent is:

1. A ball bearing structure comprising an inner ring, said ring being separated into at least two elements, a retainer, balls carried by said retainer engaged with said inner ring, and an outer ring, said outer ring being engaged with said balls, the inside diameter of said outer ring being substantially equal to the outside diameter of the assembled elements of said inner ring and a further ring partially overlying said inner ring and serving to prevent radial displacement thereof.

2. A bearing structure for use on a shaft having a bearing receiving surface confined endwise by enlarged portions, said bearing comprising an inner ring having an inside diameter less than the diameter of said enlarged portions, said inner ring being formed in at least two parts and engageable with said bearing surface and one of said enlarged portions, a retainer, anti-friction means carried by said retainer engageable with said inner ring, said retainer having an inside diameter less than the diameter of said enlarged portions and being formed in at least two parts, and an outer ring having engagement with said anti-friction means, said outer ring serving to enclose and prevent radial displacement of the parts of said inner ring and said retainer and maintain said inner ring in engagement with said one enlarged portion.

3. A bearing structure for use on a shaft having a bearing receiving surface confined endwise by enlarged portions, one of said portions including an annular shoulder, said shoulder, in cross section, being formed in a large radius curve, said bearing comprising a transversely split inner ring, the inner surface of said ring being contoured to fit the curved shoulder of the enlarged portion of said shaft, a retainer, anti-friction means carried by said retainer engageable with said inner ring, an outer ring having engagement with said anti-friction means, and a further ring mounted on one of said enlarged portions, said further ring partially overlying said inner ring and serving to prevent radial displacement thereof.

4. A bearing structure for use on a shaft having a bearing surface confined axially by enlarged portions, one of said portions including an annular shoulder, said shoulder, in cross section, being curved, said bearing comprising a transversely split retainer, anti-friction means carried by said retainer engageable with the curved surface of said shoulder, and an outer ring engaged with said anti-friction means, said outer ring having an inside diameter slightly greater than the diameter of one of the enlarged portions of said shaft whereby to mount said outer ring on said bearing surface and secure the elements of said retainer against radial displacement.

5. A bearing structure for use on a shaft having a bearing receiving surface confined axially by enlarged portions, said bearing comprising an inner ring separated into two elements, one surface of said inner ring being contoured to fit the contour of one of said enlarged portions, an outer ring having an inside diameter slightly greater than the diameter of one of the enlarged portions of said shaft, and anti-friction means interposed between and in engagement with said inner and outer rings, said outer ring serving to prevent radial displacement of the elements of said inner ring and said anti-friction means.

6. An anti-friction thrust bearing comprising, an annular split race, an annular solid race larger than said split race, a split retainer between said races and anti-friction elements in said split retainer between said races arranged to transmit a portion of the load between said races into an inwardly directed radial force on said split race to force the parts thereof together.

THOMAS BARISH.